United States Patent
Vitkus et al.

(10) Patent No.: US 6,538,969 B1
(45) Date of Patent: Mar. 25, 2003

(54) SYSTEM AND METHOD FOR IMPLEMENTING OPEN AND CLOSED FILE SYSTEMS ON A STORAGE MEDIUM

(76) Inventors: Richard A. Vitkus, 3013 Crossfield Rd., Richmond, VA (US) 23233; Scott B. Baird, 9101 Hoke Brady Rd., Richmond, VA (US) 23231; Robert W. Schumann, 11723 Quay Rd., Oakton, VA (US) 22124

(*) Notice: Subject to any disclaimer, the term of this patent is extended or adjusted under 35 U.S.C. 154(b) by 0 days.

(21) Appl. No.: 09/743,610
(22) PCT Filed: Jun. 4, 1999
(86) PCT No.: PCT/US99/12447
   § 371 (c)(1),
   (2), (4) Date: Jan. 12, 2001
(87) PCT Pub. No.: WO99/63424
   PCT Pub. Date: Dec. 9, 1999

Related U.S. Application Data
(60) Provisional application No. 60/088,219, filed on Jun. 5, 1998.

(51) Int. Cl.[7] .................................................. G11B 7/00
(52) U.S. Cl. ................. 369/59.25; 369/47.1; 369/53.1; 369/275.3
(58) Field of Search .......................... 369/47.1, 47.15, 369/47.21, 53.1, 53.44, 59.1, 59.23, 59.25, 275.3

(56) References Cited

U.S. PATENT DOCUMENTS

| | | | |
|---|---|---|---|
| 5,200,943 A | 4/1993 | Sano et al. | |
| 5,687,397 A | 11/1997 | Ohmori | |
| 5,694,381 A | 12/1997 | Sako | |
| 5,719,717 A | 2/1998 | Leonhardt et al. | |
| 5,752,009 A | 5/1998 | Nakahara et al. | |
| 5,959,946 A | 9/1999 | Tognazzini | |

FOREIGN PATENT DOCUMENTS

| | | |
|---|---|---|
| EP | 0 634 741 | 1/1995 |
| WO | WO 98/00839 | 1/1998 |

*Primary Examiner*—Muhammad Edun
(74) *Attorney, Agent, or Firm*—McDermott, Will & Emery; Paul Devinsky

(57) ABSTRACT

A structure and method are described that make it possible to store both open-format data and closed-format data on a single storage medium, such as a DVD disc, by organizing the data in an open file data system and a specialized closed file data system. The closed file data system may be encapsulated in the open file data system. The storage medium is segmented into open file data spaces, containing data recorded using the open-format techniques, and closed file data spaces, containing data recorded using closed-format techniques, or using a specialized technique. The open-format data can be accessed using both open-format and close-format hardware, whereas the closed-format data can only be accessed using specialized hardware.

33 Claims, 6 Drawing Sheets

| Storage Medium 102a |
|---|

Fig. 2b

| OF Partition 204 | Tran Area 206 | CF Partition 208 |
|---|---|---|

Fig. 3a

| OF File Space 300 |
|---|

Fig. 3b

| OF Anchor 302 | OF Dir 304 |
|---|---|

Fig. 3c

| OF File 1 310 | OF File 2 312 | OF File N 314 | Tran File(s) 316 | CF File 1 318 | CF File 2 320 | CF File 3 322 | CF File N 324 |
|---|---|---|---|---|---|---|---|

Fig. 4a

| CF File Space 400 |
|---|

Fig. 4b

| CF Anchor 402 | CF Dir 404 |
|---|---|

Fig. 4c

| CF File 2 320a | CF File 3 322a | CF File N 324a |
|---|---|---|

Fig. 5a

| Storage Medium 102b |
|---|

Fig. 5b

| OF Partition 504 | Tran Area 506 | CF Partition 508 | Tran Area 510 | OF Partition 512 | Tran Area 514 | CF Partition 516 |
|---|---|---|---|---|---|---|

Fig. 6a

| OF File Space 600 |
|---|

Fig. 6b

| CF File Space 1 602 | | CF File Space 2 604 |
|---|---|---|

Fig. 7a

| OF File Space 1 700 | OF File Space 2 702 |
|---|---|

Fig. 7b

| CF File Space 1 704 | CF File Space 2 706 |
|---|---|

SYSTEM AND METHOD FOR IMPLEMENTING OPEN AND CLOSED FILE SYSTEMS ON A STORAGE MEDIUM

This application claims the benefit of Provisional Application No. 60/088,219, filed Jun. 5, 1998.

FIELD OF INVENTION

The present invention generally relates to a system and method for storing both open-format data and closed-format data, in multiple storage formats on a single storage medium, using a common indexing system. More particularly, the invention relates to a system and method for storing open and closed-format data on a storage medium, such that the open-format data can be accessed using both conventional and specialized hardware, whereas the closed-format data can only be accessed using specialized hardware capable of accessing data stored using multiple storage formats on a single storage medium for example using a common indexing system. More particularly still, the present invention relates to a system and method for storing open and closed-format data on optical storage media.

BACKGROUND OF THE INVENTION

There are various types of random access media, including storage media for computer hard drives, CDs (compact discs), and DVDs (digital videodiscs or digital versatile discs). Both CDs and DVDs are examples of optical storage media Each type of random access media conforms to a standard, which specifies the characteristics of a medium, including an ensemble of at least the physical structure, the sector format, and a file system for referencing the files on a given medium, hereinafter "ensemble".

An example of an ensemble can be found in the DVD specification for Read-Only Disc published by Toshiba Corporation.

A second example of an ensemble can be found in the industry standard ISO/IEC 10149:1995, titled "Information technology—Data exchange on read-only 120 mm optical data disc (CD-ROM)". This is known in the industry as the "Yellow Book" standard and describes physical and logical file formats for CD_ROM.

A third example of an ensemble can be found in the industry standard IEC 60908 Ed. 1.0 b:1987, titled "Compact disc digital audio system". This is known in the industry as the "Red Book" standard and applies to a pre-recorded optical reflective digital audio disc system. The Red Book defines those parameters of compact discs that affect interchangeability between discs and players. It is also intended as a reference for manufactures wishing to produce discs.and/or players that conform to the system described in this standard.

A standard ensemble for a particular storage medium ensures interoperability among different hardware implementations for accessing data on the medium. For example, an optical disc DVD conforming to a open video specification and containing the correct video formatting can be played or read by any DVD player that was designed to play DVDs conforming to that open-format DVD specification. The general techniques for organizing ensembles on DVD media and the standards used are described in DVD Demystified, by J. Taylor, McGraw Hill (1988), Chapters 3 and 4 as well as the particular DVD specification.

It may be desirable, however, to store data using different formats, e.g. a combination of video, CD audio, and DVD formats, on the same storage medium. This involves the use of a new type of hybrid disk which may contain separate (differentiated) physical structures, sector formats, and file systems on the same media.

Furthermore, in order to control access to data, it may be desirable to design disks having data stored in differentiated formats so that only specialized hardware can read or play all of the data on these disks, while allowing open-format hardware to read or play only a select portion of the data on these disks. Such differentiated playback can be achieved by implementing separate playback methods whereby access to data is limited on a partition by partition basis. For example, by changing the order in which the data bytes are stored within each sector, or by using a different error correction code (ECC) algorithm, encapsulation barriers can be imposed. If data in a closed-format (CF) partition is recorded using a CF ECC, the DVD player must be specially equipped to process this CF ECC data. In order to create specialized content that is inaccessible to conventional open-format (OF) hardware, other methods to arrange data in a closed-format or to encrypt data can also be used.

A method for making a single CD-ROM disc useable on computers having unrelated operating systems or for multimedia platforms is described in U.S. Pat. No. 5,359,725, issued to Garcia et al. However, this patent exemplifies the use of a single disk on two different operating systems, i.e., the Hierarchical File System (IFS) used by Macintosh computers, or MS-DOS, the operating system used by IBM and compatible personal computers. This system, using the CD-ROM standard ensemble stores the MS-DOS files directly and translates the Macintosh files into MS-DOS files with corresponding data and resource forks. In operation, this system uses a common ISO file system in conjunction with a translation layer thereby allowing either a MS-DOS based system or Macintosh based system to access all the files.

A method for storing data on multiple optical disk volumes in an optical disk autochanger is described in U.S. Pat. No. 5,579,516 issued to Van Maren et al. This patent describes a method of accessing data from a large data base; the data base consisting of a plurality of optical disks in an autochanger, by using readily addressable directories. Therefore, in this system, a plurality of files contained on a plurality of disks may be accessed from a single area of meta-data, which includes directory information and file information.

However, none of these systems provide a method or apparatus for accessing both OF and CF data, which coexists and interoperates on a single medium. What is needed is a method and apparatus for reading and/or writing data on a single storage medium in both OF and CF data structures.

SUMMARY OF THE INVENTION

It is an object of the invention to provide a single storage medium on which both open-format ensembles and closed-format ensembles co-exist.

It is another object of the invention to allow both open-format ensembles and closed-format ensembles to co-exist, and interoperate, on a single, hybrid storage medium.

It is another object of the invention to provide a method and apparatus for controlling access to data on random access storage media It is yet a further object of the invention to permit enabled specialized hardware (e.g., a playback only system or a playback/write system) to access (i.e., read or read and write to) closed and open-format ensembles; wherein open-format hardware would be enabled to access only open-format data structures on that same media.

It is still a further object of the invention to allow specialized hardware to access data on a storage medium using either an open file system or an encapsulated (i.e., proprietary) closed-file system.

It is still a further object of the invention to allow open-format hardware to access data on a hybrid disc storage (i.e., a disc having both open-format and closed-format ensembles) medium using an open file system.

It is yet still a further object of the invention to provide a hybrid disc with a user message to inform the user that the disc is intended for play on a closed-system player when an attempt to play that disc on an open-format-only system player is attempted.

It is still a further object of the invention to provide a hybrid disc containing a multitude of different open and closed-format partitions, the number of partitions being limited only by the space on the disk.

It is still a further object of the invention to provide a disc and playback system wherein a user can manually select the content to be accessed when the user's hardware is capable of playing a multitude of ensembles on a hybrid disc.

In general, in one aspect, the invention features a file storage structure for storing open-format data and closed-format data on a file storage medium. The structure comprises an encapsulated file area on the file storage medium referencing a first set of data on the file storage medium, a non-encapsulated file area on the file storage medium referencing the first and a second set of data on the file storage medium The first set of data and the second set of data is readable from within the non-encapsulated file area by a first data processing system, whereas the second set of data is only readable from the non-encapsulated file area by a second data processing system.

Preferably, one embodiment of the present invention further includes an indicator, indicating whether the file storage medium being accessed contains a closed-format data area Preferably, in this embodiment, the storage medium may be a DVD disc, and the indicator may be a specific file on the DVD disc. Furthermore, in this embodiment, the indicator preferably may comprise a transition file.

Preferably, another embodiment of the present invention includes a plurality of encapsulated, closed-format file areas and non-encapsulated, open format file areas.

Preferably, another embodiment of the present invention includes a transitional area between the non-encapsulated file areas and the encapsulated file areas. More specifically, transitional area may contain no content data Still further, a portion of the transition data area adjacent to the non-encapsulated file area may contain file data recorded using a non-encapsulated recording technique whereas a portion of the transition data area adjacent to the encapsulated file area may contain file data recorded using an encapsulated recording technique.

In general, in another aspect, the invention features a file storage structure for storing open-format data and closed-format data on a single storage medium. The structure comprises closed-format file area on the file storage medium referencing closed-format data on the file storage medium, and an open-format file area on the file storage medium referencing open-format and closed-format data on the file storage medium. The closed-format data and the open-format data is readable from within the closed-format file area by a first data processing system and only the open-format data is readable from the open-format file area by a second data processing system.

Preferably, one embodiment of the present invention includes an indicator, indicating whether the file storage medium being accessed contains a closed-format data area Further, this embodiment may preferably use a DVD disc as the storage medium and a specific file on the DVD disc as the indicator. Still further, this indicator may be a transition file.

Preferably, in another embodiment of the present invention, the open-format file area is not encapsulated and closed-format file area is encapsulated into the open-format file area and further comprises a plurality of encapsulated and nonencapsulated file areas.

In general, in another aspect, the invention features a method of writing a file structure on a storage medium. The method comprises the steps of storing an encapsulated file close format or non-encapsulated closed-format onto a first area of the storage medium, the closed-format file referencing a first set of data stored on the storage medium and storing a non-encapsulated open-format file onto a second area of the storage medium, the non-encapsulated open-format file referencing a second set of data stored on the storage medium. The first set of data and the second set of data are readable from within the second area by a first open-format data processing system and the second set of data is only readable from said second area by a second data processing system having a closed-format reading capability.

In general, in yet another aspect, the invention features a method of reading a file structure from a storage medium. The method comprises the steps of reading an encapsulated or non-encapsulated closed-format file from a first area of a file storage medium exclusively by a first data processing system the encapsulated or non-encapsulated closed-format file referencing a first set of data on the storage medium, and reading a non-encapsulated open-format file from a second area of the storage medium with the first data processing system or a second data processing system, the non-encapsulated open-format file referencing the first and a second set of data on the storage medium.

Preferably, one embodiment of the present invention further includes accessing the encapsulated file using a non-encapsulated or open-format file directory in the second area. Further, this embodiment may preferably include determining from the non-encapsulated open-format file directory, the file sector of the encapsulated or non-encapsulated closed-format file to be accessed In general, in still another aspect, the invention features a method of restricting access to data stored on a storage medium. The storage medium has both an open-format area, including an open-format directory and non-encapsulated data corresponding to the open-format directory, and a closed-format area, including a closed-format directory and encapsulated or non-encapsulated data corresponding to the closed-format directory. The method of restricting access comprises the steps of determining from the open-format directory a first logical sector number of the identification file of the data to be accessed, and determining from the open-format directory a second logical sector number of the file sector which contains the data to be accessed. When the second logical sector number is greater than or equal to the first logical sector number, data is accessed with a closed-format data reading device. On the other hand, when the second logical sector number is less than the first logical sector number, data is accessed with an open-format data reading device.

In general in still yet another aspect, the invention features a method of writing a file structure on a storage medium comprising the steps of storing a first file onto a first area of the storage medium, the first file referencing a first set of data stored on the storage medium, storing a second file onto a second area of the storage medium, the second file referencing a second set of data stored on the storage medium, wherein the first set of data and the second set of data are readable from within the second area by a first open-format data processing system and the second set of data is only readable from said second area by a second data processing system having a closed-format reading capability.

In general, in still another aspect, the invention features a method of reading a file structure from a storage medium comprising the steps of reading a first file from a first area of a file storage medium exclusively by a first data processing system, the first file referencing a first set of data on the storage medium, and reading a second file from a second area of the storage medium with the first data processing system or a second data processing system, the second file referencing the first and a second set of data on the storage medium.

Preferably, one embodiment of the present invention further includes accessing the first file using a file directory in the second area. This embodiment preferably further includes determining from the second file directory, the file sector of the first file to be accessed.

In general, in still another aspect, the invention features a method of restricting access to data stored on a storage medium. In this method, the storage medium has an open-format area, including an open-format directory and first data corresponding to the open-format directory, and a closed-format area including a closed-format directory and second data corresponding to the closed-format directory. The method comprises the steps of determining from the open-format directory a first logical sector number of the identification file of the data to be accessed. When the second logical sector number is greater than or equal to the first logical sector number, data is accessed with a closed-format data reading device. On the other hand, when the second logical sector number is less than the first logical sector number, data is accessed with an open-format data reading device.

The advantages of the invention include the provision of a storage medium designed to utilize an open file system, yet also incorporate an encapsulated or non-encapsulated closed file system, such that the two file systems can co-exist on a single storage medium. In addition, open-format hardware can access only select portions of data on the medium, whereas specialized (e.g., closed-format) hardware can access all data on the medium. This combination of file design and hardware allows different data structures to be stored on, and read or written from, a single medium.

Other objects, features, and advantages of the invention will become apparent from the following description and from the claims.

BRIEF DESCRIPTION OF THE DRAWINGS

The accompanying drawings, which are incorporated in and form a part of the specification, illustrate an embodiment of the present invention and, together with the description, serve to explain the principles of the invention In the drawings.

DETAILED DESCRIPTION OF THE INVENTION

Figure 5A:
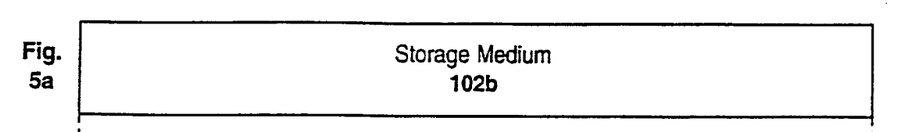
FIGS. 5a and 5b illustrate an example of a physically partitioned multiformat disc with multiple open and closed-format partitions.
Figure 5B:
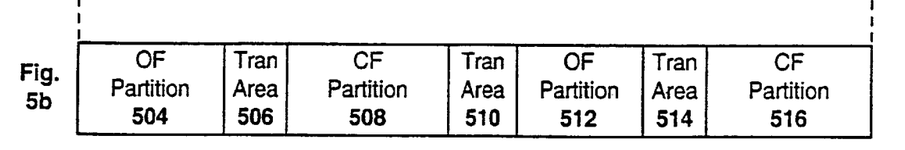
Figure 6A:
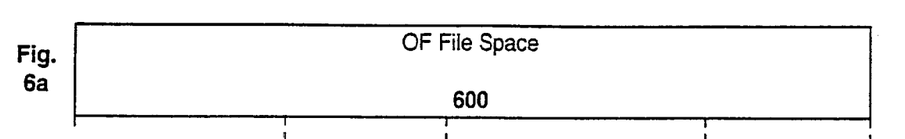
FIGS. 6a and 6b illustrate an example of an open-format file space having two closed-format file spaces.
Figure 6B:
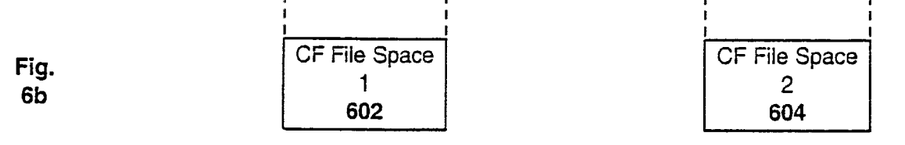
Figure 7A:
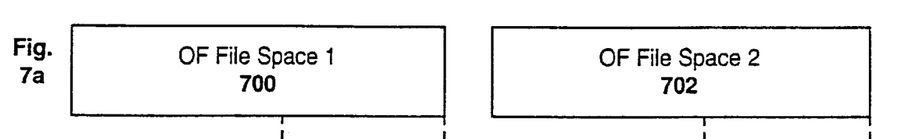
FIGS. 7a and 7b illustrate an example of two open-format file spaces, each having a closed-format file space.
Figure 7B:
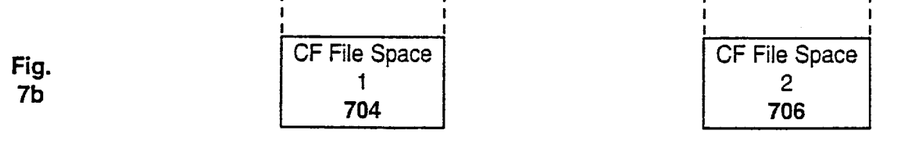

A system and method for allowing both a closed ensemble and an open ensemble to co-exist and optionally to interoperate on a single storage medium will now be described with reference to the accompanying figures. The invention may be implemented in special-purpose hardware, or software applications running on general-purpose hardware, or a combination of both In the following description, for the purposes of explanation, numerous specific details are set forth in order to provide a more thorough understanding of the present invention. FIGS. 1 through 4, and 8 through 10 illustrate a presently contemplated best mode for practicing the invention. FIGS. 5 through 7 illustrate examples of alternative embodiments. It will be apparent, however, to one skilled in the art that the present invention may be practiced without these specific details.

To facilitate understanding, the following discussion of the following terms, when used in the specification, are intended to convey the following meanings:

Anchor: A sector or collection of sectors that typically define the beginning of the file space and contain control and housekeeping information for the file system.

Closed-format ("CF") hardware: Specialized hardware that is capable of reading or writing to discs or to areas of discs that may be specialized in nature and to discs or areas of discs that conform to any open-format industry standard ensemble. Such hardware may include means to conditionally limit access to data in a closed-format file space.

Directory: A listing of all files in a file space. Typically, directories are implemented as one or more data files within the file system.

File space: A subset of the storage medium for which the file system describes the usage and allocation of space. A closed-format file space is usually, but not always, encapsulated within an open-format file space.

File system: A collection of structures which define the usage and allocation of a file space. Typically, these structures include anchors, directories, files, and free space.

Hybrid format disc: A disc containing both closed and open ensembles.

Open-format ("OF") hardware: Hardware that is capable of reading or writing discs or areas of discs that conform to an open-format industry standard ensemble.

Examples of relevant industry standards include the DVD specification, the Red book, and the Yellow book Partition: A physical subset of the storage medium, which is used store data using a conforming physical and sector format.

Storage medium: A single structure on which data may be read from or written to; the structure may be either a single level and/or two dimensional structure, or a multi-level and/or multi-dimensional structure capable of or storing encoded data. Non-limiting examples include a crystal lattice having alterable optical properties, and a media having alterable ferromagnetic domains.

Transition area: A physical subset of the storage medium, located between partitions. In general, transitional areas are incorporated into the design when data in adjoining partitions uses different physical and or sector formats. Consequently, transition areas are not always needed, such as in the case where all data—the data in both the OF file space area and the CF file space area—is recorded using similar ensembles, or in the case where both OF and CF hardware are capable of handling contiguous, non-identical, recording techniques. Ideally, the transition areas are designed such that the portion of the transition area adjacent to an OF partition contains data recorded using OF recording techniques. Similarly, the portion of a transition area adjacent to a CF partition is preferably recorded using CF recording techniques. The incorporation o f transition areas prevents hardware errors when data near a boundary between an OF partition and a CF partition is accessed.

In general, the present invention provides structures, as well as a methodology or protocol for allowing a closed file system and an open file system to co-exist and inter-operate on a data storage medium, such that CF hardware can access the data referenced by both file systems, whereas conventional OF hardware can only access the data referenced by the OF system except for files in the OF system which are stored in a CF partition. Furthermore, in general, data referenced by the CF system may be encoded, either according to open or closed-format recording techniques, on a given storage medium. In accordance with the present invention, for a typical system comprising both closed and open-format file systems, in order to allow both an open data file system and a closed file system to coast on a single storage medium, the medium is typically segmented into two types of areas: an OF file space, which can be accessed by both OF and CF hardware, and a CF file space, which can be only accessed by CF hardware.

While the following description references the applicability of the present invention to reading data on a disc, such as a DVD-video disc, that application is only used for purposes of convenience and ease of understanding. It is not intended that the present invention be limited to that implementation. Rather, the present invention applies generally to systems and methods for accessing both an open file system and a closed file system which co-exist, and potentially inter-operate, on a single storage medium. Further, as will be appreciated by the artisan, the present invention also generally applies to methods and an apparatus for reading and/or writing data in both open-format structures and closed-format structures on a single storage medium.

Figure 1:
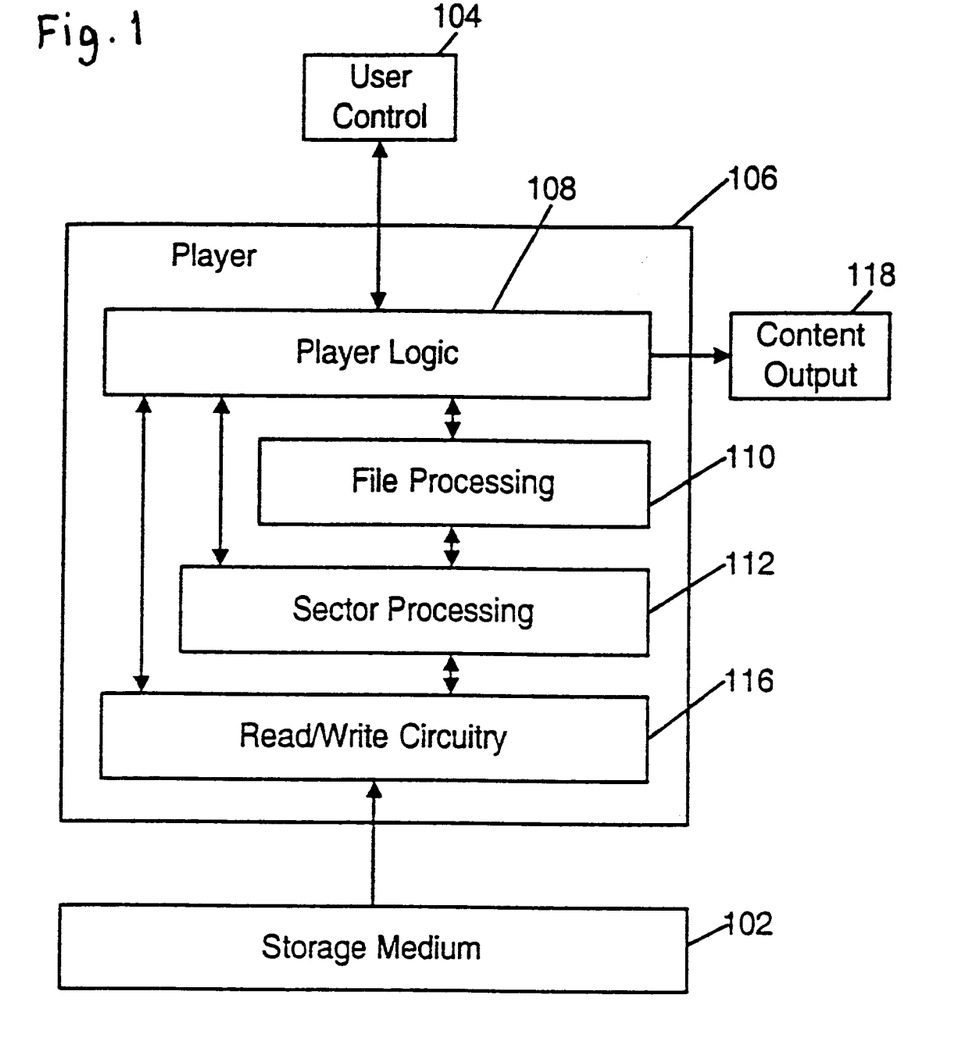
FIG. 1 illustrates an embodiment of an apparatus capable of reading or writing hybrid formats on or to discs according to the present invention.

FIG. 1 generally illustrates an exemplary design of an apparatus capable of reading or writing hybrid format discs according to the present invention. The apparatus includes a user control 104, e.g., for a DVD player 106, examples of which include a control panel on the apparatus or a remote control device. The DVD player 106 includes player logic circuitry 108, which provides system control functions and transforms processed data into content output data 118. File processing logic circuitry 110 is provided in order to process both open and closed-format data files. The file processing logic circuitry preferably communicates (two-way) with the player logic 108. A sector processing section 112 processes the disc data on a physical sector basis. The sector processing section 112 preferably communicates (two-way) with the file processing section 110 and the player logic 108. The sector processing section 112 may include any Error Correcting Codes (ECC) used, or other methods of limiting or enabling access to data. A read/write circuit 116, reads and/or writes information from a storage medium 102. The read/write circuit preferably communicates (two-way) with the sector processing section 112 and the player logic 108.

Still referring to FIG. 1, when, for example, instructed by the-user through use of the user control 104, the player 106 accesses data from the storage medium 102, for example a DVD-video disc. The system then outputs the content output 118 to a display system, for example a television set (not shown). More specifically, responsive to commands from the player logic 108, the file processing section 110 and the sector processing section 112, the read/write circuit 116 reads data from the storage medium 102. A determination is then made as to whether the storage medium is a disc containing an open-format file system or, a disc containing a closed-format file system, or a disc containing hybrid formats. The player logic 108 makes this determination by examining the disc data for ID files, e.g., at each data partition. Preferably, once the format of a disc is determined, that information is stored in memory for future use to avoid the need to repeatedly make the same determination. After the format of the disc is determined, the read/write circuit 116, the sector processing logic 112, and the file processing logic 110, are switched into the proper mode by the player logic circuitry 108. The content data within the data files is then processed into usable content output data 118 by the player logic 108.

It may be desirable to allow the user to select which content he wants to access using the user control 104. This will be especially true where a multitude of distinct and separate OF or CF ensembles are present on the storage medium 102.

The present invention deals effectively with the situation where the storage medium 102 is a hybrid format disc- In such a situation, an OF file directory resides in the OF file space and references every file on the storage medium i.e. both OF and CF file data. The closed-format file system resides in the CF file space, and only references files in the CF file space. This strategy permits every file in the CF system to be indexed using either the OF directory or the CF directory. Furthermore, this strategy permits every file in the CF system to be accessed using either the OF directory or the CF directory, provided the hardware is CF hardware, designed to permit such access.

Exemplary embodiments of specific disc layouts are described below with reference to FIGS. 2 through 7.

Figure 2A:
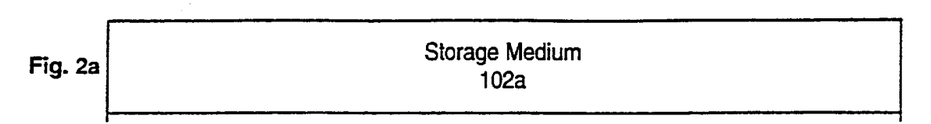
FIG. 2a is a graphical representation of an addressable space on a storage medium.
Figure 2B:
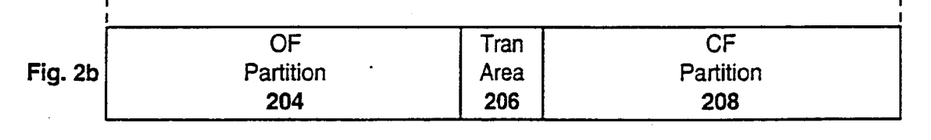
FIG. 2b is a graphical representation of an addressable space on a storage medium that is physically partitioned for use as a hybrid disc.

With reference to FIGS. 2a and 2b, a storage medium 102a, for example a DVD-video disc, is physically separated into an OF partition area 204, a transition area 206, and a CF partition area 208.

FIGS. 3a, 3b, 3c, and FIGS. 4a, 4b, and 4c illustrate a storage medium, which is physically partitioned (similar to the partitioning of storage medium 102a of FIG. 2b), and which has been logically organized at the file level.

Figure 3A:
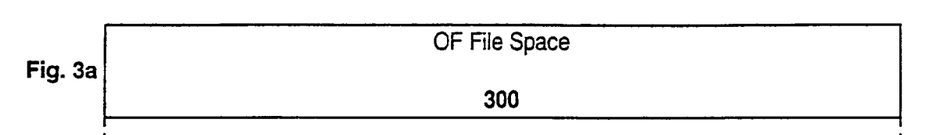
FIGS. 3a, 3b and 3c illustrate an open-format file space on a hybrid format storage medium
Figure 3B:
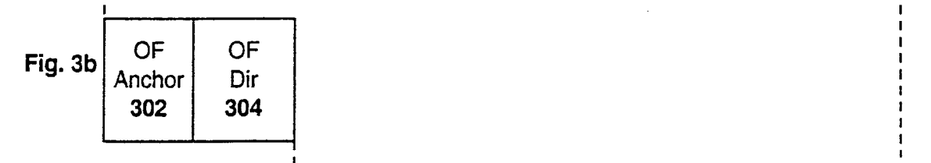
Figure 3C:
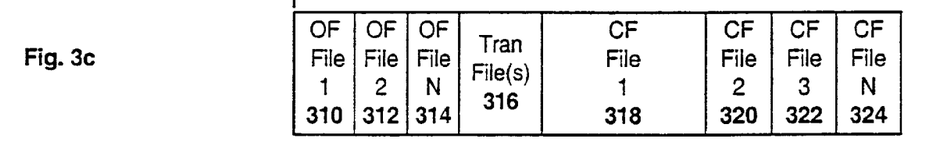
Figure 4A:
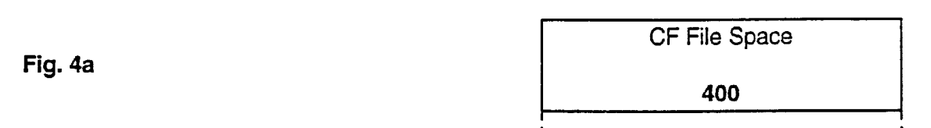
FIGS. 4a, 4b, and 4c illustrate a closed-format file space on a hybrid format storage medium

In FIG. 3a the storage medium 102a includes an OF file space 300, which may or may not include within it a CF file space 400 (as seen in FIG. 4a). In the example of FIGS. 3a through 3c, the CF file space 400 (FIG. 4a) and the OF file space 300 are on the same storage medium 102a, the CF file space 400 being "encapsulated" within the OF file space 300. The OF file space 300 includes an OF anchor area 302, an OF directory area 304, OF file areas 310, 312, and 314, a transition file(s) 316, and may also include various CF file areas, 318, 320,322, and 324, which are further discussed below in connection with FIGS. 4a–4c. Transition file(s) 316 incorporates at least the file space within OF file space 300 such that the space reserved by transition area 206 is contained within the transition file(s) boundaries. In other words, the transition file(s) 316 exist in order to cover the transition area 206 within the OF file space 300.

Figure 4B:
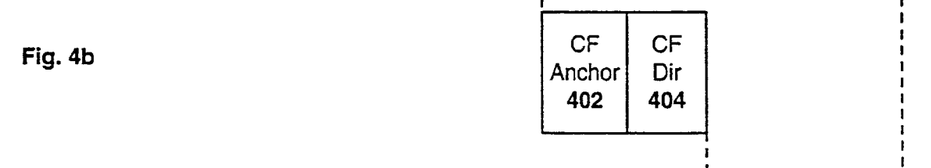
Figure 4C:
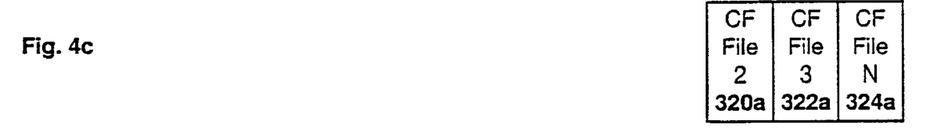

As alluded to above, FIGS. 4a, 4b, and 4c illustrate an example of an encapsulated CF file space. The CF file space 400 includes a CF anchor area 402, a CF directory area 404, and CF files 320a, 322a, and 324a, are the same as CF files 320, 322 and 324 in FIG. 3C.

In FIG. 3c, the OF file areas 1, 2 and N as well as CF file areas 2, 3 and N are merely representative of separate data files, and it should be appreciated that the present invention is not limited as to the number of such files. The number of such files is only limited by the available disc space.

Further embodiments of the present invention include a plurality of OF file space and CF file space areas on the same storage medium. Examples of such embodiments are described below with reference to FIGS. 5 through 7.

FIGS. 5a and 5b illustrate an embodiment of a disc layout, including the physical and sector parts of an ensemble. In this embodiment, a plurality of OF partitions and CF partitions coexist on the same storage medium 102b. The OF partitions 504 and 512 are physically separated from the CF partitions 508 and 516 by the transitional areas 506 and 514. As is known to the artisan, different partitions can have combinations of different physical structures, e.g., pit structures and land structures and/or sector size, ECC blocks, etc., as well as other recording techniques. The CD and DVD specifications are examples of ensembles that define such differences. The transitional areas provide a physical buffer space between these physically different parts of a disc.

FIGS. 6a and 6b illustrate a partial file space allocation based on the partitioning shown in FIG. 5b. In this embodiment, a single OF file space area 600, (which preferably includes the OF partition area 504, the CF partition area 508, the OF partition area 512, and the CF partition 516 area of FIG. 5b) also encapsulates two distinct and separate CF file spaces 602 and 604. In this embodiment, the OF file space 600 preferably includes an OF anchor (not shown), an OF directory (not shown), and OF data files (not shown). CF file space 602 and CF file space 604 also each include a CF anchor (not shown), a CF directory (not shown), and CF data files (not shown).

In other words, in the embodiment illustrated in FIGS. 6a and 6b, the OF directory lists all files in the in the OF file space, including all files in the encapsulated CF file spaces 602 and 604.

FIGS. 7a and 7b illustrates an alternative partial file space allocation based on the partitioning depicted in FIG. 5b. It is possible for no file space to be allocated within the transition area 510. In this embodiment, a plurality of OF file spaces: OF file space 1, 700; and OF file space 2, 702, as well as a plurality of CF file spaces: CF file space 1, 704; and CF file space 2, 706, coexist on the same storage medium 102b. Each of the OF file spaces 700 and 702 preferably includes its own OF anchor (not shown), OF directory (not shown), and OF data file (not shown). Furthermore, the OF file space 1, 700 includes CF file space 1, 704, whereas the OF file space 2, 702 includes a separate and distinct CF file space 2, 706.

In the embodiment depicted by FIGS. 7a and 7b, the OF directory in OF file space 700 lists only files in the OF file space 700, including all files in CF file space 704, whereas the OF directory in OF file space 702 lists only files in the OF file space 702, including all files in CF file space 706. The OF directories for each OF file space 700 and 702 are separate and distinct from each other, and therefore do not lists files in the other's OF file space.

The CF directory in CF file space 1, 704, lists only those files contained in the in the CF file space 1, whereas the CF directory in CF file space 2, 706, lists only those files contained in the in the CF file space 2. The CF directories for each of the CF file spaces 704 and 706 are separate and distinct from each other, and therefore do not lists files in the other's CF file space.

Figure 8:
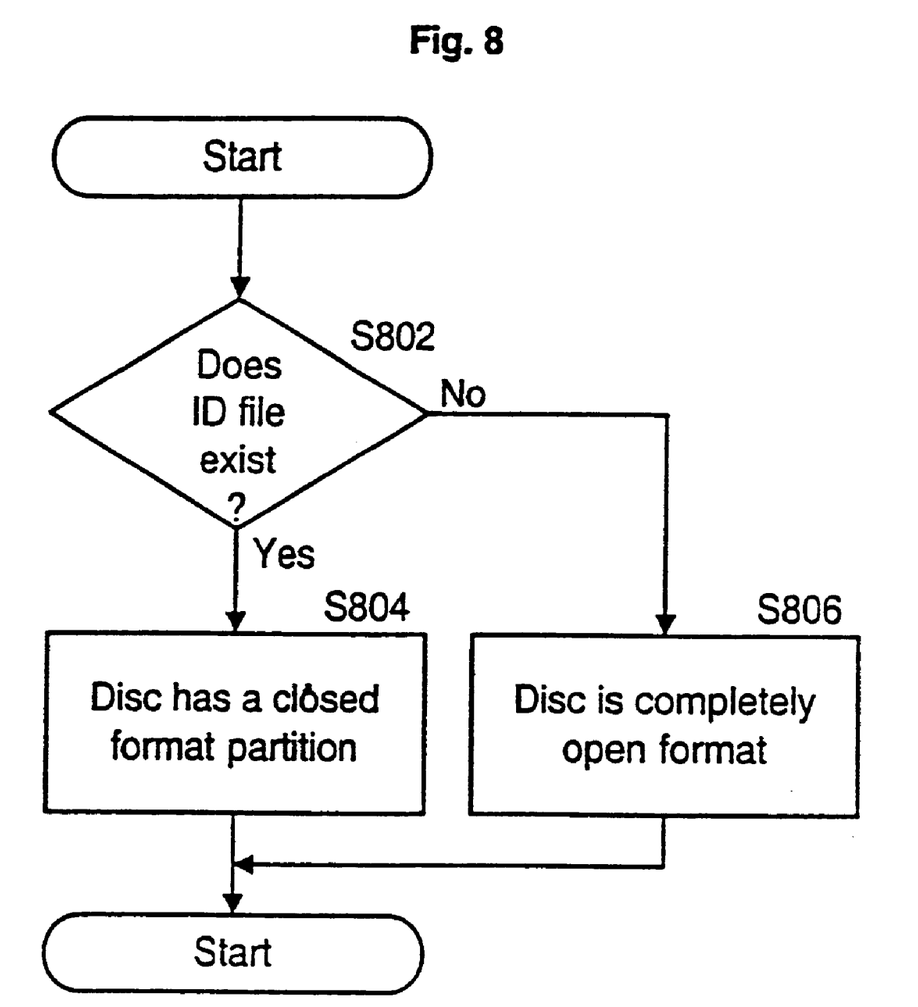
FIG. 8 is a flow chart of a method of determining the type of disc being played, for example, from the disc types illustrated in FIGS. 2–4.

The logic for determining the type of disc presented will now described with reference to FIG. 8. In order to determine the characteristics of the storage medium, when the read/write circuitry 116 reads and or writes to the storage medium, a determination is preferably made as to whether an ID file or flag (e.g., the anchor) or other indicator exists (S802). This determination is preferably made by the player logic 108.

If no ID file exists, then the system proceeds to step S806, wherein the disc is determined to be completely OF. The player 106 is then operated in the OF mode, and the data from the disc is processed as OF data.

If at step S802, it is determined that an ID file exists, the system preferably proceeds to step S804 where a determination is made that a closed-format partition exists. The player 106 is then switched into the CF mode, and the data from the disc is processed as CF data. In this case, the closed-format files must be accessed in order to process the information from the storage medium. Accessing the CF files may be accomplished by using either the OF directory or the CF directory.

Figure 9:
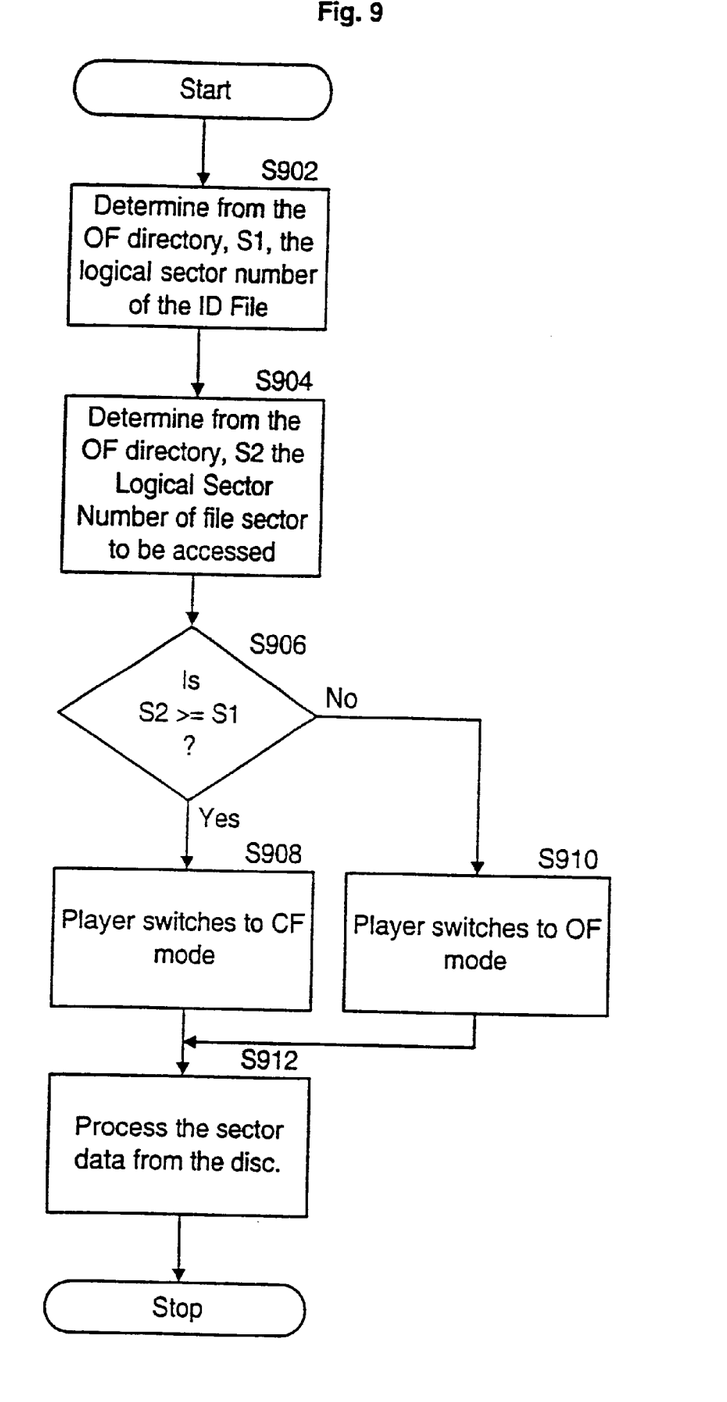
FIG. 9 is a flow chart of a method for accessing closed-format files using an open-format directory.

The method of accessing the CF files by using the OF directory will now be described with reference to FIG. 9.

At step S902, the file processing logic 110 determines, from the OF directory, the location of the logical sector number (e.g., S1) of the ID file. Then at step (S904), the file processing logic 110 determines, from the OF directory, the location of the logical sector number (e.g., S2) of the sector to be accessed.

If $S2 \geq S1$, the player 106 switches into CF mode, and it is determined whether player 106 is capable of reading CF data (S911). If player 106 is capable of reading CF data, the data from the disc is processed as CF data (S912). If player 106 is not capable of reading CF data, a notice is generated to the user (S913). Non-limiting examples of a notice includes a visually perceivable or audio message stating that in order to play the loaded DVD, a specific type of DVD player must be used.

However, if $S2 \geq S1$, the player 106 is switched into the OF mode at S910, and the data from the disc is processed as OF data (S912).

Figure 10:
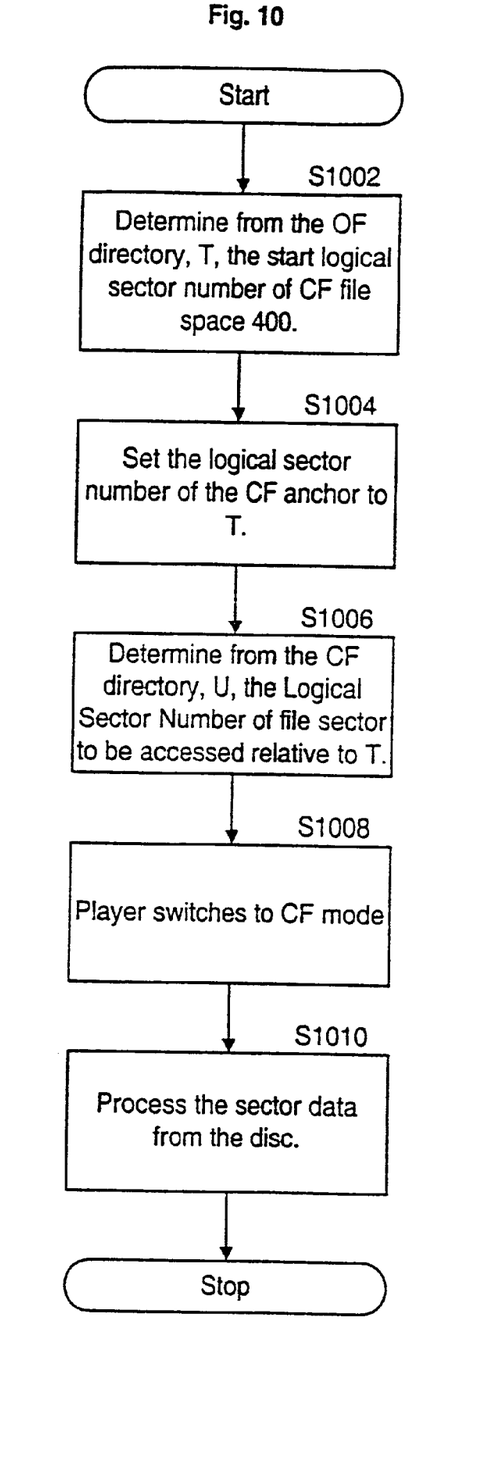
FIG. 10 is a flow chart of a method for accessing closed-format files using a closed-format directory.

A method of accessing CF files using the CF directory will now be described with reference to FIG. 10.

At step S1002, the file processing logic 110 determines, from the OF directory, the start logical sector number (e.g., T) of the CF file space 400. The CF logic circuitry then sets the logical sector number of the CF anchor to T (S1004). At this point the file processing logic 110 determines, from the CF directory, the logical sector number (e.g., U) of the file sector to be accessed relative to T. At step S1008, the player 106 is switched to CF mode, whereby the player logic 108 instructs the read/write circuitry 116 to read and or write to the sector data from the disc in CF mode. The information from the CF sector is then processed for content output (S1010).

The foregoing description of the preferred embodiments of the invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claim appended hereto.

What is claimed is:

1. A file storage structure for storing open-format data and closed-format data on a single storage medium comprising:
   a) an open-format partition on said storage medium having an open-format ensemble comprising a first physical structure, a first sector format, and a first file structure including a set of open-format data;
   b) a closed-format partition on said storage medium having a closed-format ensemble comprising a second physical structure, a second sector format, and a second file structure including a set of closed-format data; and
      wherein said open-format ensemble and said closed-format ensemble are different in at least one aspect of their respective physical structure, sector format and file structure, and
   wherein a closed-format file space is encapsulated in an open format file space.

2. The file storage structure according to claim 1, wherein the open-format data is readable by a open-format data processing system or a closed-format data processing system and said set of closed-format data is readable only by said closed-format data processing system.

3. The file storage structure according to claim 1, further comprising a transition area separating said open-format partition and said closed-format partition.

4. The file storage structure according to claim 3, wherein said open-format ensemble further comprises an identifier for identifying the location of said transition area.

5. The file storage structure according to claim 3, further comprising an indicator for indicating that the file storage medium being accessed contains a closed-format ensemble.

6. The file storage structure according to claim 5, wherein said storage medium is a DVD disc; and
   said indicator is a file in the open-format partition of said DVD.

7. The fly The file storage structure according to claim 5, wherein said indicator comprises a transition file in said transition area.

8. The file storage structure according to claim 7, wherein said transition area includes at least one transition data file.

9. The file storage structure according to claim 8, wherein said transition data file contains no content data.

10. The file storage structure according to claim 3, wherein a portion of the transition area adjacent to the open-format partition contains open-format data and a portion of the transition area adjacent to the closed-format partition contains closed-format data.

11. The file storage structure according to claim 1, further comprising a plurality of open and closed-format partitions.

12. The file storage structure according to claim 1, wherein a closed-format file space is encapsulated in a open format file space.

13. A method of writing a file structure on a storage medium comprising the steps of:
   (a) storing an encapsulated, closed-format file system onto a closed-format file space of the storage medium, said encapsulated, closed-format file system referencing a set of closed-format data stored on said storage medium;
   (b) storing a non-encapsulated, open-format file system onto an open-format file space of said storage medium, said open-format file space including said closed-format file space, said non-encapsulated, open-format file system referencing the set of open-format data stored on said storage medium and said set of closed-format data stored on said storage medium;
      wherein the set of closed-format data and the set of open-format data are readable by a first data processing system having a closed-format data processing capability and the set of closed-format data is not readable by a second data processing system having only an open-format reading capability.

14. A storage medium for storing a file structure comprising:
   (a) closed-format file system on an encapsulated, closed-format file space of said storage medium, said encapsulated, closed-format file space referencing a set of closed-format data stored on said storage medium;
   (b) open-format file system on an non-encapsulated, open-format file space of said storage medium, said non-encapsulated, open-format file space referencing said set of closed-format data and a set of open-format data on said storage medium;
      wherein the set of closed-format data and a set of open-format data being readable from within the non-encapsulated, open-format file space by a closed-format data processing system but the set of closed-format data not being readable from said non-encapsulated, open-format file space by an open-format data processing system.

15. The storage medium according to claim 14, further comprising:
   at least one physical partition separating an encapsulated, closed-format partition and an non-encapsulated, open-format partition.

16. The storage medium according to claim 15, wherein said physical partition is a transition area.

17. The storage medium according to claim 15, wherein said non-encapsulated, open-format file space has an identifier for identifying, the location of said transition area.

18. The storage medium according to claim 14, further comprising:
   an indicator for indicating that the file storage medium being accessed contains a closed-format file space.

19. The storage medium according to claim 18, wherein said storage medium is a DVD disc; and
   said indicator is a file in the non-encapsulated, open-format file space.

20. The storage medium according to claim 19, wherein said indicator comprises a transition file.

21. The storage medium according to claim 14, further comprising a plurality of encapsulated, closed-format file spaces and non-encapsulated, open-format file spaces.

22. The storage medium according to claim 14, further comprising:

at least one transition file between non-encapsulated, open-format partitions and encapsulated, closed-format partitions.

23. The storage medium according to claim 22, wherein said at least one transition file contains no content data.

24. The storage medium according to claim 22, wherein a portion of the transition area adjacent to the open-format partition contains open-format data whereas a portion of the transition data area adjacent to the closed-format partition contains closed-format data.

25. A method of reading a file structure from a storage medium comprising the steps of (a) reading an encapsulated, closed-format file system from a closed-format file space exclusively by a closed-format data processing system, said encapsulated, closed-format file system referencing a set of closed-format data on said storage medium;

(b) reading a non-ecapsulated, open-format file system from an open-format file space with an open-format data processing system or said closed-format data processing system, said non-encapsulated, open-format file system referencing a set of open-format data and said set of closed-format data on said storage medium.

26. The method of reading a file structure from a storage medium according to claim 25 further comprising the step of:

reading an encapsulated, closed-format file within the encapsulated, closed-format file system by accessing said encapsulated, closed-format file using a non-encapsulated, open-format file directory in said open-format file space.

27. The method of reading a file structure from a storage medium according to claim 26 wherein the step of accessing the encapsulated, closed-format file further includes:

determining from the non-encapsulated, open-format file directory, the file sector of the encapsulated, closed-format file to be accessed.

28. The method of reading a file structure from a storage medium according to claim 25 further comprising the step of:

reading an encapsulated, closed-format file within the encapsulated, closed-format file system by accessing the encapsulated, closed-format file using an encapsulated, closed-format file directory in said encapsulated, closed-format file space.

29. A method of restricting access to data stored on a storage medium, said storage medium having an open-format file space including an open-format directory and non-encapsulated, open-format data referenced by a portion of the open-format directory, and a closed-format file space including a closed-format directory and encapsulated, closed-format data referenced by the closed-format directory and by the open-format directory, said method comprising the steps of:

determining from the open-format directory a first logical sector number of the closed-format file space to be accessed;

determining from the open-format directory a second logical sector number of the file sector which contains the data to be accessed;

when the second logical sector number is greater than or equal to the first logical sector number, accessing data using a closed-format data reading device, and when the second logical sector number is less than the first logical sector number, accessing data using an open-format data reading device.

30. A method of writing a file structure on a storage medium comprising the steps of:

(a) storing an closed-format file system onto a closed-format file space of the storage medium, having a closed-format physical structure and a closed-format sector format, said closed-format file system referencing a set of closed-format data on said medium;

(b) storing an open-format file system onto an open-format file space of said storage medium, having a open-format physical structure and an open-format sector format, said open-format file system referencing a set of open-format data and a set of closed-format data stored on said storage medium; and (c) either one of the closed-format physical structure or the closed-format sector format is different from the respective open-format physical structure or open-format sector format;

wherein the set of open-format data is readable from within said open-format file space by an open-format data processing system and the set of closed-format data is only readable from said closed-format file space by a closed-format data processing system having a closed-format reading capability.

31. A method of reading a file structure from a storage medium comprising the steps of:

(a) reading a closed-format file system from a closed-format file space of a file storage medium exclusively by a closed-format data processing system, said closed-format file system referencing a set of closed-format data on said storage medium;

(b) reading an open-format file system from an open-format file space of said storage medium with the closed-format data processing system or an open-format data processing system, said open-format file system referencing the set of closed-format data and a set of open-format data on said storage medium.

32. The method of reading a file structure from a storage medium according to claim 31, further comprising the step of:

reading a closed-format file within the closed-format file system by accessing the closed-format file using a file directory in the open-format file space.

33. The method of reading a file structure from a storage medium according to claim 32, wherein the step of accessing the first file further includes:

determining from an open-format file directory, the file sector of the first file to be accessed.

* * * * *